(12) United States Patent
Lee

(10) Patent No.: US 7,050,129 B2
(45) Date of Patent: May 23, 2006

(54) LIQUID CRYSTAL DISPLAY MODULE OF CAR AUDIO

(75) Inventor: Wan-Woo Lee, Kyunggi-do (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 4 days.

(21) Appl. No.: 10/704,679

(22) Filed: Nov. 12, 2003

(65) Prior Publication Data

US 2005/0052585 A1   Mar. 10, 2005

(30) Foreign Application Priority Data

Sep. 6, 2003   (KR) ...................... 10-2003-0062334

(51) Int. Cl.
*G02F 1/1335*   (2006.01)

(52) U.S. Cl. ...................................... 349/65
(58) Field of Classification Search .................. 349/65

See application file for complete search history.

(56) References Cited

U.S. PATENT DOCUMENTS

| | | | | |
|---|---|---|---|---|
| 4,673,254 A * | 6/1987 | Kato et al. | ..................... | 349/65 |
| 5,729,310 A * | 3/1998 | Horiuchi et al. | ............... | 349/58 |
| 5,739,880 A * | 4/1998 | Suzuki et al. | ................. | 349/58 |
| 5,867,235 A * | 2/1999 | Hasegawa | ..................... | 349/58 |
| 5,886,759 A * | 3/1999 | Mashino et al. | ............... | 349/65 |
| 5,949,505 A * | 9/1999 | Funamoto et al. | ............. | 349/65 |
| 6,104,455 A * | 8/2000 | Kashima | ...................... | 349/65 |

FOREIGN PATENT DOCUMENTS

| | | |
|---|---|---|
| JP | 5-264995 | 10/1993 |
| JP | 9-145932 | 6/1997 |
| KR | 1999-023490 | 3/1999 |

* cited by examiner

*Primary Examiner*—James A. Dudek
(74) *Attorney, Agent, or Firm*—Greenblum & Bernstein P.L.C.

(57) ABSTRACT

The present invention relates to a liquid crystal display module of a car audio with less occurrence of moiré adjacent to a light source by disposing a sheet having a densely printed pattern at the rear side of a light guide plate.

4 Claims, 2 Drawing Sheets

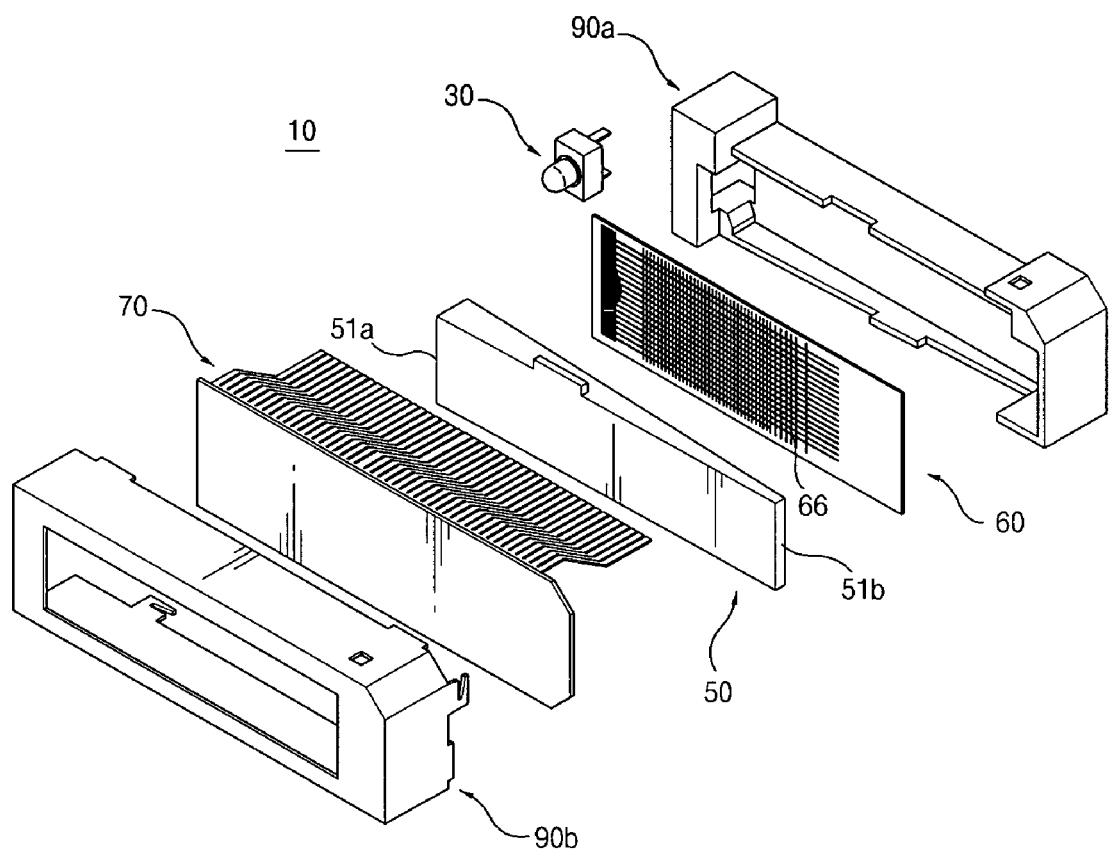
[FIG. 1]

[FIG. 2]
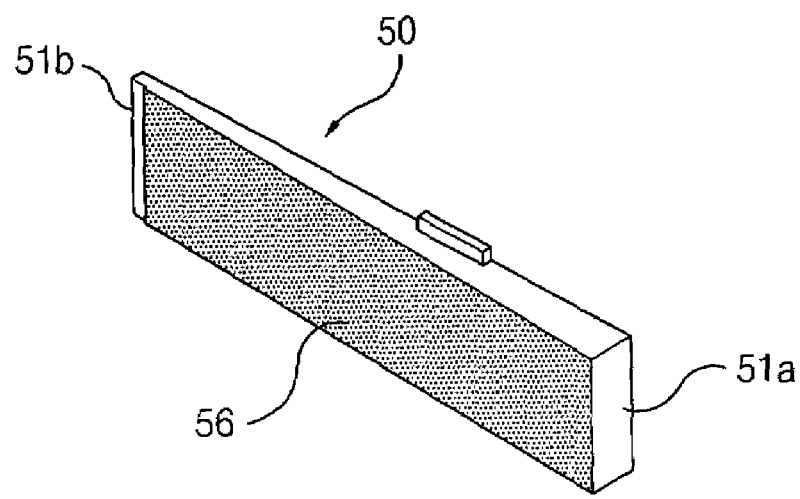
[FIG. 3]
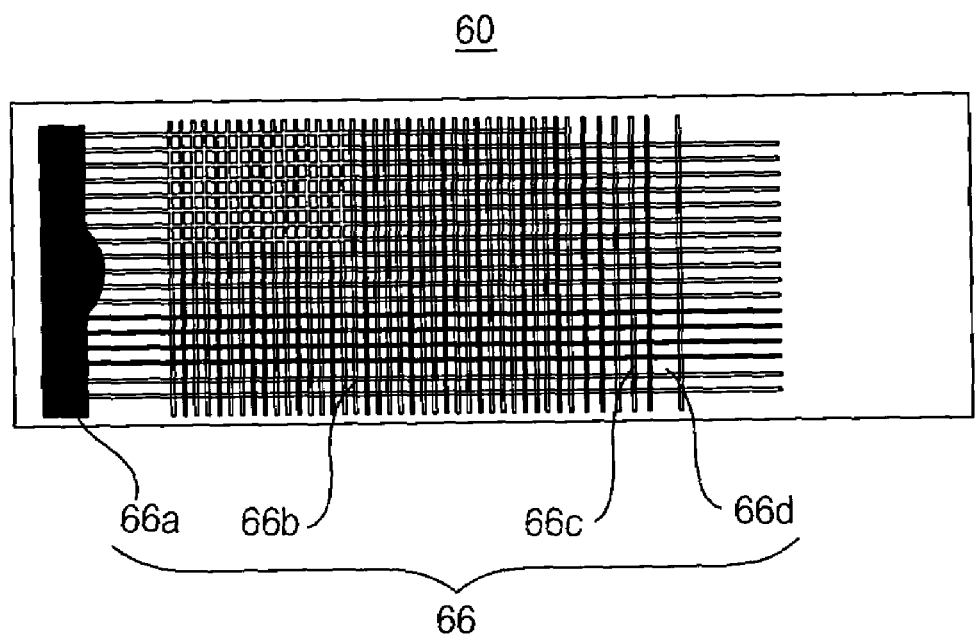

LIQUID CRYSTAL DISPLAY MODULE OF CAR AUDIO

The present disclosure relates to subject matter contained in priority Korean Application No. 10-2003-0062334, filed on Sep. 6, 2003, which is herein expressly incorporated by reference in its entirety.

BACKGROUND OF THE INVENTION

1. Field of the Invention

The present invention relates to a liquid crystal display module of a car audio with less occurrence of moiré adjacent to a light source by disposing a sheet having a densely printed pattern at the rear surface of a light guide plate.

2. Description of the Related Art

In general, a display device is one of key electronic components prevailing in an information (oriented) society. Particularly, a light guide plate for a backlight system of an image display device such as a liquid crystal display device is a transparent flat plate or wedge shaped plate, and reflects the light from the light source, uniformly illuminating the entire area of the light guide plate.

This type of light guide plate has been disclosed, for example, in Korean Patent Publication No. 1999-23490, and Japanese Patent Publication Nos. 1997-145932 and 1993-264995.

According to the teachings of the above disclosures, most of the rear surface of the light guide plate has dot patterns, so an incident light thereon is reflected and scattered, and emitted to a front surface.

The most difficult thing for designing a liquid crystal display module for a car audio incorporating a light guide plate with the dot pattern is that the width of the liquid display module has a limit. Thus a lamp, which is a light source in a LCD, is typically positioned adjacent to a view area of the LCD. In fact, this has a great impact on the brightness of the backlight structure. This explains why much of the light is scattered and a moiré phenomenon occurs adjacent to the backlight, eventually deteriorating an image display quality.

Moreover, it is very complicated to manufacture metal patterns for injection molding of the pattern.

SUMMARY OF THE INVENTION

It is, therefore, an object of the present invention to provide a liquid crystal display module of a car audio with an improved display quality and easy manufacture of metal patterns by preventing occurrence of a moiré phenomenon.

To achieve the above object, there is provided a liquid crystal display module for a car audio, including: a light source; a light guide plate having the light source at one side; a sheet disposed at a rear surface of the light guide plate; an LCD panel disposed at a front surface of the light guide plate; and a housing for housing and shielding the light source, the sheet, the light guide plate, and the LCD panel, wherein a dense pattern is formed on the sheet.

In the embodiment, a dense pattern is formed on the sheet.

With the above constitution, the injection molding of the light guide plate gets more simplified, and because the amount of reflection is reduced by means of the densely patterned sheet, occurrence of the moiré phenomenon adjacent to the light source can be effectively prevented.

In the embodiment, the angle of light dispersion can be increased by additionally forming the pattern on the rear surface of the light guide plate. As a result, the incident light is more uniformly irradiated onto the entire screen of the LCD panel, and the image display quality is greatly improved.

In the embodiment, the thickness of the light guide plate is gradually decreased as it goes from an incident side adjacent to the light source to an opposite side of the incident side. Thus, the incident light from the incident side of the light can be more effectively incident upon the pattern until it reaches the opposite side, thereby improving light emission efficiency.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view of separated parts of a liquid crystal display module of a car audio in accordance with a preferred embodiment of the present invention;

FIG. 2 is a perspective view of a bottom side of a light guide plate in FIG. 1; and FIG. 3 is an enlarged front view of a sheet in FIG. 1.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 1 is a perspective view of separated parts of a liquid crystal display module of a car audio in accordance with a preferred embodiment of the present invention, FIG. 2 is a perspective view of a bottom side of a light guide plate in FIG. 1, and FIG. 3 is an enlarged front view of a sheet in FIG. 1.

As depicted in FIG. 1, the liquid crystal display module 10 of a car audio includes a light source 30, a light guide plate 50 disposed at one side of the light source 30, a sheet displaced at a rear surface of the light guide plate 50, an LCD panel 70 on a front surface of the light guide plate 50, and a housing 90a; 92b for housing or shielding these components.

On the sheet 60, as FIG. 3 illustrates, is a densely printed pattern 66. That is, a dense pattern having a small pitch is formed on an incident side 51a adjacent to the light source 30, and as it goes to an opposite side 51b of the incident side 51a, a sparse pattern 66d with a large pitch is formed.

As such, when a light incidents on the incident side 51a and is reflected by the light guide plate 50 from its inner surface to the rear surface, the amount of the reflection of this reflected light is reduced at the dense pattern before the light is emitted. In this manner, occurrence of moiré adjacent to the light source 30 is suppressed.

In addition, as shown in FIG. 2, an etched or serration-structured pattern 56 is preferably formed on the rear surface of the light guide plate 50. Through this pattern 56, the dispersion angle of the incident light is increased, and the light is more uniformly irradiated onto the entire screen of the LCD panel 70. Hence, an image display quality is greatly improved.

As for another embodiment, the light guide plate 50 can also be a wedge shaped flat plate. In other words, the thickness of the light guide plate 50 is gradually decreased in the direction from the incident side 51a adjacent to the light source 30 to the opposite side 51*b* of the incident side 51*a*. Through this wedge shape, the incident light from the incident side 51*a* of the light is more effectively incident on the pattern 56 until it reaches the opposite side 51*b*. To be short, light emission efficiency is improved.

Typically, the light guide plate 50 is injection molded to a transparent material in the plastic group, e.g. acryl (PMMA: PolyMethylMetaAcrylate).

The housing 90*a* houses the light source 30, the sheet 60 and the light guide plate 50, and the housing 90*b* is a shield case for shielding the LCD panel 70. This housing 90*a*; 90*b* is fitted into a main body of a car audio.

In conclusion, the liquid crystal display module of a car audio of the present invention has the following advantages.

First, the liquid crystal display module includes a light source, a light guide plate having the light source at one side thereof, a sheet disposed at the rear surface of the light guide plate, an LCD panel disposed at the front surface of the light guide plate, and a housing for housing the light source, the sheet, the light guide plate and the LCD panel inside, wherein the sheet, has the dense pattern. Therefore, there is no need to form another pattern on the light guide plate, and thus, the injection molding thereof is more simplified. Also, because the amount of reflection is reduced by means of the densely patterned sheet, occurrence of the moiré phenomenon adjacent to the light source can be effectively prevented.

Second, additionally forming the pattern on the rear surface of the light guide plate, the angle of light dispersion is increased. As a result, the incident light is more uniformly irradiated onto the entire screen of the LCD panel, and the image display quality is greatly improved.

Third, since the thickness of the light guide plate is gradually decreased as it goes from the incident side adjacent to the light source to the opposite side of the incident side, the incident light from the incident side of the light can be more effectively incident upon the pattern until it reaches the opposite side, thereby improving light emission efficiency.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A liquid crystal display module for a car audio, comprising:
    a light source;
    a light guide plate having the light source disposed adjacent to a single incident side of the light guide plate;
    a sheet disposed at a rear surface of the light guide plate;
    an LCD panel disposed at a front surface of the light guide plate; and
    a housing for housing and shielding the light source, the sheet, the light guide plate, and the LCD panel, wherein a dense pattern is formed on the sheet, a density of the dense pattern being gradually decreased in a direction from the incident side on which the light source is positioned to an opposite side of the incident side.

2. The liquid crystal display module according to claim 1, wherein a pattern is additionally formed on the rear surface of the light guide plate.

3. The liquid crystal display module according to claim 1, wherein a thickness of the light guide plate is gradually decreased in a direction from the incident side on which the light source is positioned to an opposite side of the incident side.

4. The liquid crystal display module according to claim 2, wherein a thickness of the light guide plate is gradually decreased in a direction from the incident side on which the light source is positioned to an opposite side of the incident side.

* * * * *